Jan. 5, 1937.  A. GRIGAS  2,066,468
FENDER FOR AUTOMOBILES
Filed Feb. 11, 1935  2 Sheets-Sheet 2
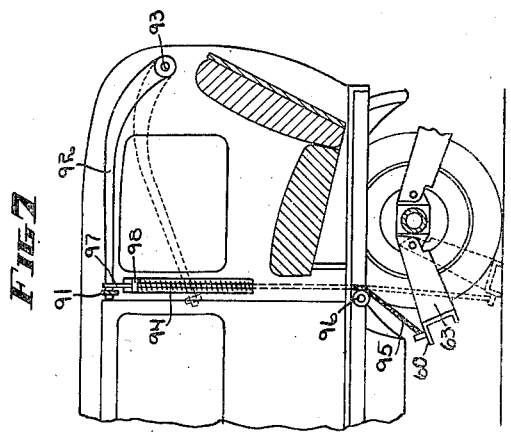
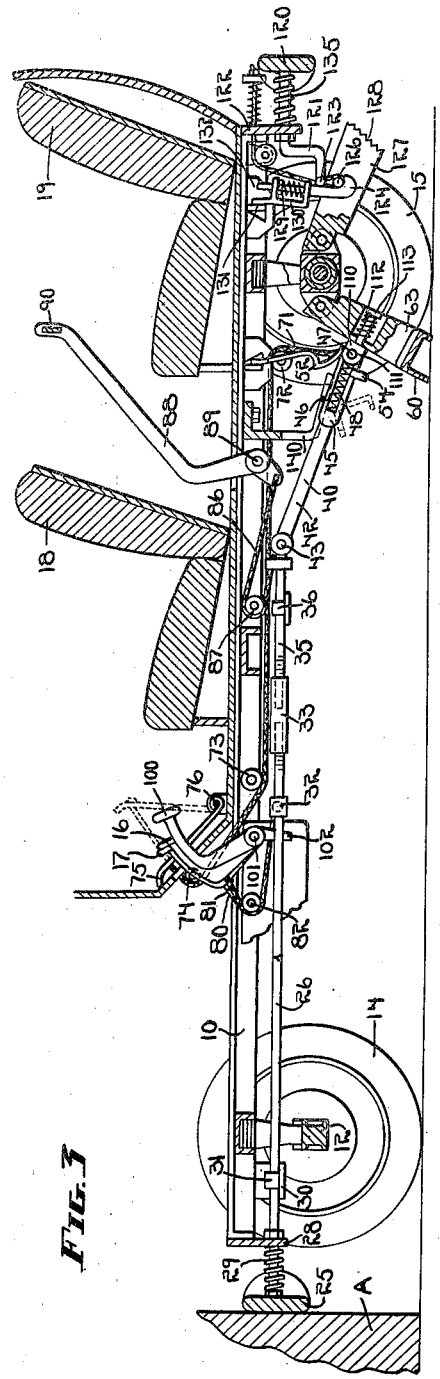
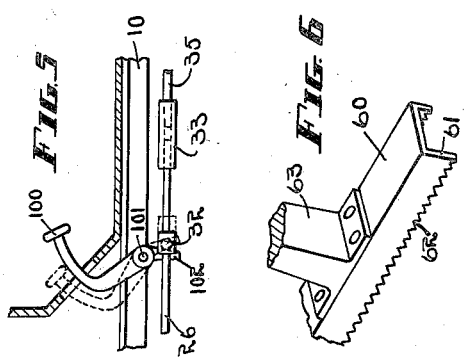
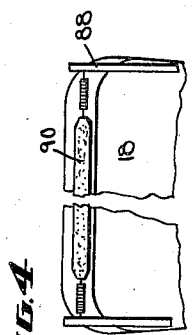
Inventor
Anthony Grigas
By Walter H. Wakefield
Attorney Patented Jan. 5, 1937

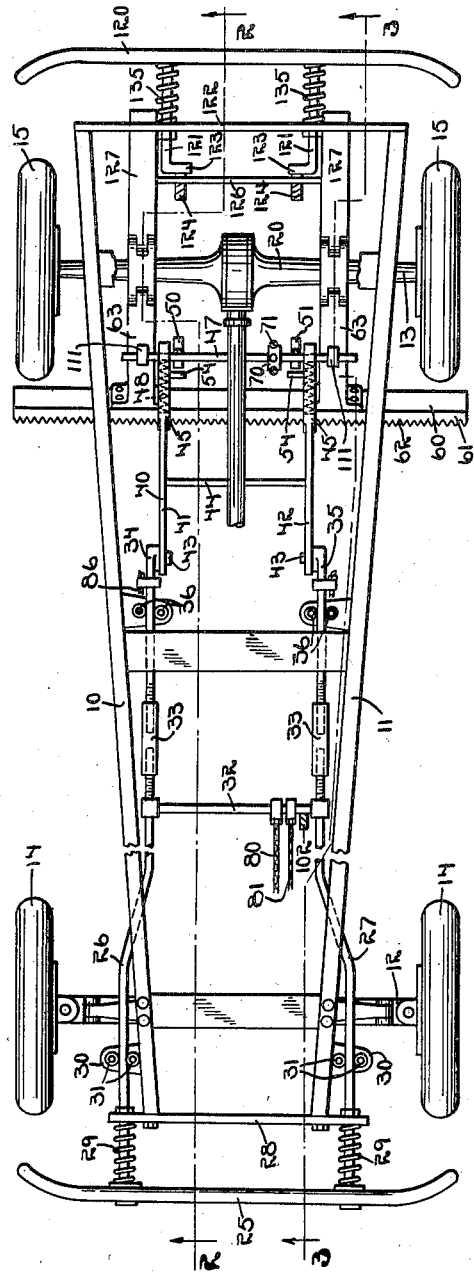

2,066,468

UNITED STATES PATENT OFFICE 2,066,468

FENDER FOR AUTOMOBILES

Anthony Grigas, Worcester, Mass.

Application February 11, 1935, Serial No. 6,009

10 Claims. (Cl. 180—83)

This invention relates to improvements in automatically acting emergency stopping mechanism for vehicles and it is the general object of the invention to provide means for stopping the vehicle quickly should it encounter an obstacle.

It is a further object of my invention to provide means which will automatically apply the brakes of the vehicle and also disconnect the engine clutch when the vehicle strikes an obstruction.

The invention includes a brake bar or the like which is normally held in raised position but drops to operative position where it will grip or dig into the roadbed, and when in this lowered position may also be in contact with the rear wheels to stop the vehicle more effectively. It is a still further object of my invention to provide manual means operable by the driver from a point preferably though not necessarily within the car to reset the brake bar to normal raised position.

Another object of my invention relates to the provision of means to be operated at the will of the driver of the vehicle to enable him to lower the brake bar for the purpose of bringing the vehicle to rest quickly should an emergency develop while the driver still has time to act.

It is a still further object of my invention to provide a protector for the occupants of the vehicle which shall be brought into action automatically at the same time that the brake bar takes effect to stop the vehicle. It is to be understood that the stopping contemplated by the use of my invention is very sudden and might result in throwing passengers forwardly and it is for this purpose that I provide a protector mechanism normally located in convenient position out of the way but movable to a location in front of the passengers to check their forward motion.

It is a more detailed object of my invention to provide a guard which is operative to prevent accidental setting of the brake bar should the car pass over an object which might otherwise extend far enough above the roadbed to release the brake bar.

With these and other objects in view which will appear as the description proceeds, my invention resides in the combination and arrangement of parts hereinafter described and set forth in the claims.

In the accompanying drawings, wherein I have shown a convenient embodiment of my invention and two forms of one feature of the invention, Fig. 1 is a plan view of a vehicle or automobile chassis with the body removed and having my invention applied thereto, Figs. 2 and 3 are vertical sections on lines 2—2 and 3—3 of Fig. 1 showing the brake bar in raised position, and in lowered position, respectively, Fig. 4 is a rear elevation of the passenger protector device taken in the direction of arrow 4, Fig. 2, Fig. 5 is a detailed vertical section similar to a portion of Fig. 3 and showing the mode of operating the brake bar by a foot lever located within the vehicle, Fig. 6 is a fragmentary perspective view of a part of the brake bar, and Fig. 7 is a diagrammatic view of the modified form of passenger protector device.

Referring particularly to Figs. 1, 2 and 3, I have shown a chassis having body beams 10 and 11 which support front and back axles 12 and 13, respectively, for the front and back wheels 14 and 15, respectively. A clutch lever 16 and brake lever 17 may be provided as usual and are connected by means not shown herein to the engine and brakes, neither of which are shown, so that when these levers are depressed the engine will be unclutched and the service brakes applied. Front and back seats 18 and 19 are mounted conveniently on the chassis and the rear axle may have a housing 20.

The parts thus far described may be of usual construction and operated in the ordinary manner and of themselves form no part of my present invention.

In carrying my invention into effect I provide a fender or bumper 25 at the front of the car mounted on rods 26 and 27 located, respectively, at the right and left hand sides. These rods extend through a cross bar 28 by which they are guided and their forward ends are surrounded by relatively heavy compression springs 29 which act to hold the fender or bumper normally in front position as will be apparent from Figs. 1, 2 and 3. The beams 10 and 11 are each provided with a bearing block 30 having guide rolls or the like 31 between which the rods slide.

A cross rod 32 connects the rods 26 and 27 together to cause the same to move in unison and these rods may if desired be connected by adjustable rod heads 33 to other rods 34 and 35, respectively. These latter rods extend between guide rolls 36 similar in mounting and construction to rolls 31.

A releasing frame 40 is formed of side members 41 and 42 which are pivotally connected as at 43 to the secondary rods 34 and 35 and are attached by a strut 44 which causes both members to move together. Each member has at the rear thereof a head 45 slotted as at 46 to receive a locking pin 47. Compression springs 48 are interposed between the members 41 and 42 and the locking pin and serve normally to hold the locking pin at the rear or right hand end of the slots as viewed in Figs. 2 and 3.

Secured to the under side of the body of the vehicle are two locking hooks 50 and 51 located, respectively at the right and left hand sides of the center of the vehicle and having hooked ends 52 which normally lie under and support the locking pin 47. Tension springs 53 may be employed if desired to urge the locking hooks forwardly, but these springs are relatively light so that they do not counteract the effect of the compression springs 48. Each rod head 45 has a releasing pin 54 extending downwardly therefrom and in longitudinal alignment with the hooked ends 52. The lower part of the locks may be curved downwardly and backwardly as at 55 to facilitate resetting with respect to the locking pin 47.

The member which actually engages the road and stops the car is a pivoted structure comprising an angle bar 60 having a front wall 61, the lower edge of which may be notched as at 62 as set forth more particularly in Fig. 6. This bar is secured to a pair of arms 63 which are pivoted as at 64 to a fixed part of the vehicle. As shown particularly in Fig. 2 this pivotal connection is established by means of ears 65 which may be fast with respect to the housing 20 for the rear axle.

The locking pin 47 carries a drum 70 to which is attached a cable 71 which extends upwardly and forwardly around a sheave 72 movable about a fixed axis. The cable extends upwardly around a second sheave 73 and has a sharp turn around a third sheave 74 to be connected to a manually operated lever 75 normally down in the full line position shown in Fig. 3 and pivoted as at 76 to a part of the car structure. This cable will ordinarily be slack when the parts are in normal inoperative position.

The cross member 32 has connected thereto cables 80 and 81 which move about a center 82 as shown in Fig. 3 and are connected, respectively, to the brake and clutch levers 17 and 16. These cables will be tightened to depress the levers to which they are attached whenever the cross rod 32 is moved rearwardly.

The secondary rods 34 and 35 are each attached to a cable one of which is designated at 86 in Fig. 3. This cable extends forwardly from its point of attachment with the rods and is then bent backwardly around a center 87 to have attachment to the lower arm of the protector lever 88 pivoted as at 89 to the car or vehicle. It is to be understood that there are two of these levers, one at each side, and that they extend upwardly to support a protector guard 90 which extends between and is secured to the levers. The protector rod and levers are normally in the position shown in Fig. 2.

A modification of this protector guard is shown in Fig. 7 where the cross bar 91 is supported by levers one of which is indicated at 92 moving about a center 93 and normally held up by a light compression spring 94. A cable 95 extends downwardly from the levers 92 and around a center 96 to have attachment with the arms 63. With the arms normally up the springs 94 hold the cables taut and elevate the bar 91 and levers 92 by means of a rigid connection such as a rod 97 to which is attached a collar 98 to receive the upward thrust of the spring 94.

In order that the invention may be controlled from a point within the vehicle I provide a foot lever 100 movable about a center 101 carried by the frame of the vehicle. The finger 102 extends downwardly from the lever and is normally in the full line position shown in Fig. 5 and in front of the cross rod 32, but held in this position by gravity if desired, the location of the lever being determined by engagement of the finger 102 and the cross rod 32.

In operation, the parts will normally be in the position shown in Fig. 2 with the bumper 25 in its extreme forward position and the hooks or locks 50 engaged with the locking pin 47 to hold the bar 60 and the arms 63 elevated. When in this normal position also the passenger protector rods will be in the positions shown either in Fig. 2 or Fig. 7 and the clutch and brake levers will be free to be operated by the driver. Manually operated lever 75 will also be down and lever 100 will be in its rear position as shown in full lines in Fig. 5. The parts will maintain these normal positions during ordinary car operation but should the fender engage an abutment or obstacle A as shown in Fig. 3 the car, due to its momentum and tendency to continue forward movement, will bring about a relative motion between itself and those parts which are operatively connected to the fender or bumper. The rods 26 and 27 will be moved rearwardly with respect to the car against the action of springs 29 and by the relation to be understood from Fig. 1 the releasing frame will be projected rearwardly. The rearward motion of the releasing frame carries the unlocking pins 54 into engagement with the hooks 52 to move the latter rearwardly out of supporting relation with respect to the locking pin 47. The arms 63 together with the locking part 60 are now free to fall down by gravity to the position indicated in Fig. 3. The bar itself falls to a position very close to the wheels and the roughened or notched edge 62 grips the roadbed to stop the car abruptly before damage can be done.

During the time that the rods 26 and 27 move rearwardly with respect to the car the clutch and brake levers 16 and 17, respectively, will be moved down by the connections already described to unclutch the engine and apply the service brakes and during this same interval a force is transmitted through the cable 86 as shown in Fig. 3 to move the passenger protector bar 90 rearwardly to save any passenger who may be in the rear seat 19 from harmful forward motion. In the modification shown in Fig. 7, on the other hand, downward motion of the bar 60 effects a direct pull of the passenger protector bar 91 down to the dotted line position shown in Fig. 7.

With the car at rest and the parts as shown in Fig. 3, if it be desired to restore the parts to normal position, the hand lever 75 is raised from the full to the dotted line position shown in Fig. 3 to tighten the cable 71. The latter is attached to the locking pin through the drum 70 and therefore raises said pin together with the arms 63 and the brake bar 60. When moving upwardly the locking pin will have a camming action along the curved ends 55 of the hooks to move the same rearwardly momentarily and as the parts reach their normal position the pin is high enough to permit the locks or hooks to snap thereunder after which the lever 75 may be released to fall down to its normal position.

In order to facilitate elevation of the arms 63 should they stick I prefer to employ for each arm a connection such as is shown in Fig. 3 wherein a rod 110 is pivotally connected by head 111 to the locking pin 47, as shown in Fig. 1. Each rod passes through a part of the adjacent arm 63 and is surrounded by a relatively stiff compression spring 112 caught under a head 113 of the rod to hold head 111 against the corresponding arm 63.

If the driver of the car can see the approaching danger in time he may depress lever 100 the effect of which is to produce a rearward motion of the releasing frame 40, by connections already described, before the bumper strikes the obstacle. This action has the same effect as though the bumper had actually been depressed and results in the dropping of the locking bar to holding position.

In order to provide against an accident when backing the car I provide a rear bumper 120 mounted on a pair of rods 121 which are guided through a rear cross brace 122 and terminate in offset ends 123. These ends are located for engagement with hooks 124 which lie under and support pins 126 secured to brake arms 127. The latter may have the lowered ends roughened as at 128 in a manner similar to the forward edge of the braking bar 60.

The hooks 124 are limited as to their upward position by a nut 129 which engages part of a rocking frame 130. The latter has a cross bar 131 which is mounted for loose rocking motion in end bearings 132 carried by the beams of the chassis. The hooks are normally urged yieldingly rearwardly so that should the rear bumper engage an obstacle and be moved forwardly against the action of comparatively heavy compression springs 135 mounted as shown in Figs. 1 and 2, the hooks will be advanced to a position where the pins 126 will be unsupported, whereupon the arms 127 will drop to ground gripping position and prevent further rearward motion of the car.

From the foregoing it will be seen that I have provided effective means for stopping quickly a vehicle which is so located as to engage the bumpers. It will further be seen that both the brake and clutch levers are automatically depressed when the bumper is moved rearwardly to save the engine and apply the service brakes. Furthermore, I provide a manual lever which is operable by the driver to effect release of the brake bar should he have time to act before striking the obstacle. Also, the brake bar and its supporting arms may be raised from a position within the car by means of a hand lever and cable connection. The passengers in the rear seat of the car are protected by means of the guards 90 or 91 which may if desired be as shown more specifically in Fig. 4 and these protector guards may be connected as shown either directly to the dropping brake structure or through cable connections with the releasing frame.

Furthermore, it will be seen that I may provide a guard 140 secured to the under side of the body and having a lower end 141 extending sufficiently low to prevent accidental engagement of the releasing pins 54 with an obstacle extending upwardly from the roadbed.

Having thus described my invention it will be seen that changes and modifications may be made therein by those skilled in the art without departing from the spirit and scope of the invention and I do not wish to be limited to the details herein disclosed, but what I claim is:

1. In a vehicle having rear wheels, a brake bar adapted for engagement with the road to stop the vehicle and being normally in raised position, a lock to hold the brake bar in raised position, a releasing element attached to the brake bar and movable lengthwise of the vehicle and positioned when so moved to have engagement with the lock, and a bumper operatively connected to the releasing element and movable relatively to the vehicle when engaging an obstruction to move the releasing element into engagement with the lock to move the latter to unlocking position relatively to the brake bar and also transmit a force from the bumper to the brake bar, whereupon the latter moves to road engaging position in front of the wheels by forces derived from gravity and the bumper.

2. In a vehicle having rear wheels, a bumper to be moved upon engagement with an obstruction in the direction rearwardly with respect to the vehicle, a brake bar adapted for engagement with the road to stop the vehicle, yielding locks to hold the brake bar normally in raised inoperative position, connections extending rearwardly from the bumper toward the locks, means defining a lost motion connection between said connections and the brake bar, and tripping devices carried by said connections and movable by the bumper into engagement with the locks to move the latter to unlocking position with respect to the brake bar, whereupon the latter falls by gravity to road engaging position in front of the wheels.

3. In a vehicle having rear wheels, a bumper to be moved upon engagement with an obstruction in the direction rearwardly with respect to the vehicle, a brake bar adapted for engagement with the road to stop the vehicle, yielding locks to hold the brake bar normally in raised inoperative position, a locking pin moving with the brake bar and normally engaged with the locks, a releasing frame operatively connected to the bumper, means defining a lost motion connection between the releasing frame and the locking pin, the releasing frame movable rearwardly by the bumper and guided by the locking pin, trip means carried by the releasing frame and movable by the bumper when the latter moves rearwardly into engagement with the locks to move the latter to unlocking position relatively to the locking pin, whereupon the brake bar falls to road engaging position in front of the wheels.

4. In a vehicle having rear wheels, a bumper to be moved upon engagement with an obstruction in the direction rearwardly with respect to the vehicle, a brake bar adapted for engagement with the road to stop the vehicle, yielding locks to hold the brake bar normally in raised inoperative position, a locking pin moving with the brake bar and normally engaged with the locks, a releasing frame operatively connected to the bumper, means defining a lost motion connection between the releasing frame and the locking pin, the releasing frame movable rearwardly by the bumper and guided by the locking pin, trip means carried by the releasing frame and movable by the bumper when the latter moves rearwardly into engagement with the locks to move the latter to unlocking position relatively to the locking pin, whereupon the brake bar falls to road engaging position in front of the wheels, and yielding means between the releasing frame and the locking pin tending to move the releasing frame forwardly relatively to the locking pin.

5. In a motor vehicle, a clutch lever to be in normal driving position while the vehicle is in motion, a bumper, a brake bar, means to yieldingly lock the brake bar in elevated inoperative position, force transmitting means between and attached to the bumper and the locking means and movable rearwardly by the bumper into engagement with the locking means to move the latter to unlocking position relatively to the brake bar, and force transmitting means attached to the bumper and brake bar to cause them to move rearwardly together, whereupon the brake bar moves to road engaging position by a force derived from the bumper and connections between the force transmitting means and the clutch lever move the latter to non-driving position when the bumper unlocks the brake bar.

6. In a motor vehicle, a brake lever normally elevated when the vehicle is in motion, a bumper movable rearwardly with respect to the bar when engaging an obstruction, a brake bar, locking means normally effective to hold the brake bar in inoperative position, force transmitting means attached to the bumper and brake bar and extending between the bumper and the locking means and effective when the bumper is moved rearwardly to move the locking means to brake bar releasing position, whereupon the brake bar is moved to road engaging position by a force derived from the bumper and transmitted to the brake bar through the force transmitting means, and connections between the force transmitting means and the brake lever to depress the latter for the purpose of applying the brakes of the vehicle when the bumper operates to unlock the brake bar.

7. In a motor vehicle having a seat for passengers, a bumper, a brake bar, lock means to hold the brake bar normally elevated, a passenger guard normally in non-guarding position, force transmitting means interposed between the bumper and the lock means effective when the bumper moves rearwardly relatively to the vehicle to engage the lock means and move the latter out of locking position relatively to the locking bar, whereupon the latter falls to road engaging position to stop the car suddenly, and connections between the force transmitting means and the passenger guard to move the latter into guarding position.

8. In a motor vehicle, a bumper movable rearwardly relatively to the vehicle upon engagement with an obstruction, a brake bar for engagement with the roadbed to stop the vehicle suddenly, lock means to hold the brake bar normally elevated, a brake lever normally raised when the vehicle is in operation and effective when depressed to apply the brakes of the vehicle, a passenger guard normally in non-guarding position, and control means operatively related to the bumper and effective when the latter moves rearwardly relatively to the car to move the lock means to unlocking position relatively to the brake bar, to move the brake lever to brake applying position, and move the passenger guard from non-guarding to guarding position.

9. In a vehicle having rear wheels, a bumper on the vehicle mounted to yield rearwardly when engaging an obstruction, a brake bar movable to road engaging position in front of the wheels, a hook to hold the brake bar normally raised out of road engaging position and connections between the bumper and the brake bar capable of transmitting rearwardly a force derived from the bumper and also movable against the hook to move the latter to brake bar unlocking position, whereupon rearward movement of the connections by the bumper first unlocks the brake bar and thereafter transmits a force derived from the bumper to the brake bar tending to move the latter toward road engaging position.

10. In a vehicle having rear wheels, a brake bar for engagement with the roadbed to stop the vehicle, a yielding lock to hold the brake bar normally in raised position, a bumper, and connections between the bumper and the brake bar effective when the bumper is moved relatively to the vehicle to move the lock to unlocking position, whereupon the brake bar falls by gravity to road engaging position in front of the wheels, and the connections transmit a force from the bumper to the brake bar to move the latter to braking position by a force additional to gravity.

ANTHONY GRIGAS.